(12) United States Patent
Fushiki (10) Patent No.: US 9,027,396 B2
(45) Date of Patent: May 12, 2015

(54) CATALYST DETERIORATION DIAGNOSTIC DEVICE AND DIAGNOSTIC METHOD

(71) Applicant: Shunsuke Fushiki, Susono (JP)

(72) Inventor: Shunsuke Fushiki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/040,773

(22) Filed: Sep. 30, 2013

(65) Prior Publication Data

US 2014/0020461 A1 Jan. 23, 2014

Related U.S. Application Data

(62) Division of application No. 13/303,927, filed on Nov. 23, 2011, now Pat. No. 8,573,044.

(30) Foreign Application Priority Data

Nov. 25, 2010 (JP) ................................. 2010-262656

(51) Int. Cl.
*G01M 15/10* (2006.01)
*F01N 9/00* (2006.01)
*F01N 11/00* (2006.01)

(52) U.S. Cl.
CPC .............. *G01M 15/102* (2013.01); *F01N 9/00* (2013.01); *F01N 11/00* (2013.01); *F01N 2550/02* (2013.01); *F01N 2560/025* (2013.01); *Y02T 10/47* (2013.01)

(58) Field of Classification Search
USPC ....................................... 73/114.75
See application file for complete search history.

(56) References Cited

U.S. PATENT DOCUMENTS

| | | | |
|---|---|---|---|
| 7,114,328 B2 | 10/2006 | Nagaoka et al. | |
| 8,573,044 B2 * | 11/2013 | Fushiki | 73/114.75 |
| 8,583,349 B2 * | 11/2013 | Anilovich et al. | 701/109 |
| 8,627,646 B2 * | 1/2014 | Inoue | 60/277 |
| 8,649,957 B2 * | 2/2014 | Yoshizaki et al. | 701/103 |
| 2002/0029562 A1 | 3/2002 | Ishii et al. | |
| 2002/0184877 A1 | 12/2002 | Ishii et al. | |
| 2010/0083635 A1 | 4/2010 | Kitaura et al. | |
| 2011/0106411 A1 * | 5/2011 | Anilovich et al. | 701/109 |
| 2011/0232269 A1 * | 9/2011 | Inoue | 60/276 |
| 2012/0131992 A1 * | 5/2012 | Fushiki | 73/114.75 |

FOREIGN PATENT DOCUMENTS

| | | | |
|---|---|---|---|
| JP | 2004-278457 A | 10/2004 | |
| JP | 2010-101211 A | 5/2010 | |

* cited by examiner

*Primary Examiner* — Freddie Kirkland, III
(74) *Attorney, Agent, or Firm* — Gifford, Krass, Sprinkle, Anderson & Citkowski, P.C.

(57) ABSTRACT

A device for diagnosing deterioration of a catalyst by a decrease in oxygen storage capacity, in which the oxygen storage capacity by which the catalyst deterioration is diagnosed to be present when exhaust gas recirculation is not implemented is higher than the oxygen storage capacity by which the catalyst deterioration is diagnosed to be present when the exhaust gas recirculation is implemented.

6 Claims, 10 Drawing Sheets

CATALYST DETERIORATION DIAGNOSTIC DEVICE AND DIAGNOSTIC METHOD

CROSS-REFERENCE TO RELATED APPLICATIONS

This application is a divisional application of U.S. patent application Ser. No. 13/303,927, filed Nov. 23, 2011, which application claims priority to Japanese Patent Application No. 2010-262656 filed on Nov. 25, 2010, both of which are incorporated herein by reference in its entirety including the specification, drawings and abstract.

BACKGROUND OF THE INVENTION

1. Field of the Invention

The invention relates to a device for diagnosing catalyst deterioration on the basis of the decrease in oxygen storage capacity.

2. Description of Related Art

Some of the catalysts disposed in exhaust passages of internal combustion engines installed on vehicles have oxygen storage capability. The properties of such catalyst are such that when the air/fuel ratio of exhaust gas flowing to the catalyst is leaner than the stoichiometric air/fuel ratio, excess oxygen contained in the exhaust gas is adsorbed and retained, and where the air/fuel ratio of exhaust gas flowing to the catalyst is richer than the stoichiometric air/fuel ratio, the adsorbed and retained oxygen is released. In such catalyst, even if the actual air/fuel ratio somewhat deviates from the stoichiometric air/fuel ratio according to the operation state, this deviation of air/fuel ration can be absorbed by the oxygen storage/release action of the catalyst and the exhaust gas purification efficiency can be maintained.

Deterioration of such catalysts can be diagnosed on the basis of the decrease in oxygen storage capacity, that is, on the basis of the decrease in the maximum limit amount of oxygen that can be stored. The oxygen storage capacity of a catalyst can be measured by a Cmax method. The Cmax method is performed by conducting active air/fuel ratio control in which the air/fuel ratio of the exhaust gas flowing to the catalyst is forcibly switched to the rich side and lean side and Cmax, which is an index of catalyst oxygen storage capacity, is determined as an average value of two integral values, namely, the integral value OSAFALL of oxygen release amount during rich control and the integral value OSARISE of oxygen storage amount during lean control.

A device described in Japanese Patent Application Publication No. 2010-101211 (JP-A-2010-101211) is available as a device for diagnosing catalyst deterioration. In the device described in JP-A-2010-101211, the air/fuel ratio difference among cylinders is corrected when exhaust gas recirculation (EGR) is not implemented and then the introduction of EGR is restarted and the air/fuel ratio difference among cylinders is corrected again in this state. Catalyst deterioration is then diagnosed upon correcting the air/fuel ratio difference among cylinders after the EGR has been restarted, thereby making it possible to perform appropriate diagnostic of catalyst deterioration when the EGR is implemented.

Thus, in the device described in JP-A-2010-101211, catalyst deterioration is diagnosed when the EGR is implemented. However, when an internal combustion engine is operated, the EGR is sometimes introduced, but sometimes the EGR is not introduced. In particular, in cold climates, the operation period can mostly correspond to a semi-warmed-up state. Meanwhile, the EGR is generally implemented only when warm-up is completed. Therefore, in cold climates, the period in which the operation is performed in a state without EGR introduction is extended. Further, in a hybrid car that is provided with two drive sources, namely, an internal combustion engine and an electric motor, when the car is driven by the motor or the car is stopped, the internal combustion engine is stopped. Therefore, in winter, engine operation is mostly performed in a state in which the warm-up has not yet been completed and the period in which the operation is performed in a state without EGR introduction is likewise extended. For this reason, in order to ensure ample opportunities for diagnosis, it is desirable that catalyst deterioration be diagnosed both when the EGR is implemented and when it is not implemented.

However, in internal combustion engines installed on hybrid cars, EGR introduction is performed at a high EGR ratio equal to or higher than 15%. The results of the examination conducted by the inventors have clearly indicated that in an internal combustion engine with such large-volume EGR the catalyst state differs significantly between a period in which the EGR is implemented and a period in which it is not implemented.

Figure 10:
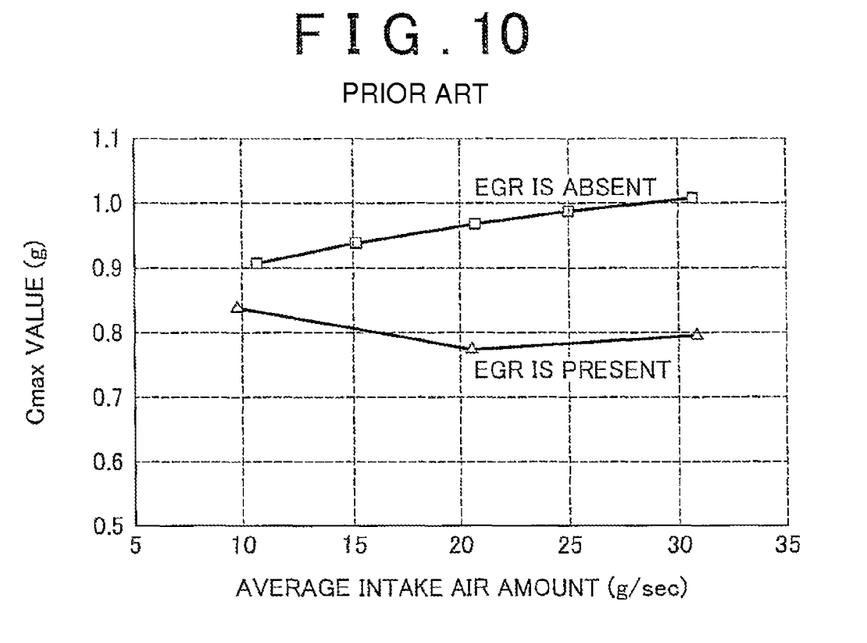
FIG. 10 is a graph illustrating the relationship between the intake air amount and oxygen storage capacity (Cmax) of the catalyst obtained when the EGR is implemented and not implemented.
Figure 11:
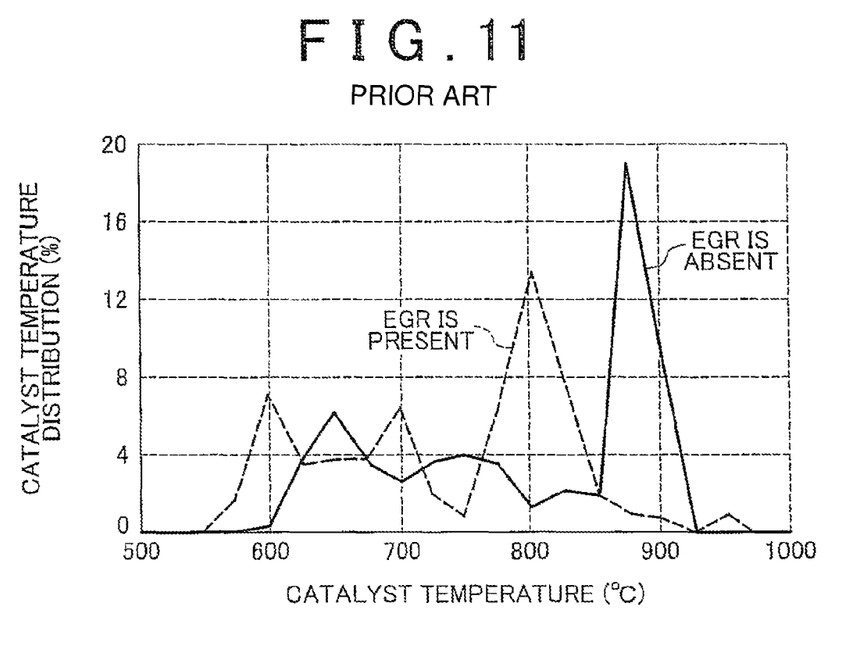
FIG. 11 shows graphs illustrating the temperature distribution of the catalyst obtained when the EGR is implemented and not implemented.

FIG. 10 shows the relationships between the Cmax and intake air amount of the internal combustion engine obtained when the EGR is implemented and when it is not implemented. The relationships have been measured by using the catalyst with the same degree of deterioration. As clearly follows from the figure, when the EGR is not implemented, the Cmax, that is, the oxygen storage capacity of the catalyst, is clearly higher than that in the implementation period. In this connection, when the EGR is implemented (EGR is present), the exhaust gas temperature is lower and the temperature distribution of the catalyst is accordingly somewhat lower, as shown in FIG. 11, than when the EGR is not implemented (EGR is absent). However, this difference in oxygen storage capacity cannot be explained merely by such a difference in temperature distribution of the catalyst.

The oxygen storage capability (capacity) of the catalyst thus differs significantly between a period in which EGR is implemented and a period in which it is not implemented. For this reason, adequate diagnosis of deterioration cannot be performed when the diagnosis is conducted in the same mode when the EGR is implemented and when it is not implemented.

SUMMARY OF THE INVENTION

The invention provides a deterioration diagnostic device and diagnostic method for a catalyst that can advantageously diagnose catalyst deterioration, regardless of whether or not the EGR is introduced.

The first aspect of the invention resides in a device for diagnosing deterioration of a catalyst by a decrease in oxygen storage capacity. In the device, the oxygen storage capacity by which the catalyst deterioration is diagnosed to be present when EGR is not implemented is higher than the oxygen storage capacity by which the catalyst deterioration is diagnosed to be present when the EGR is implemented.

As described hereinabove, even if the deterioration advance degree is the same, the oxygen storage capacity of the catalyst is higher when the EGR is not implemented than when it is implemented. Accordingly, whether or not the deterioration is present can be adequately diagnosed, regardless of variations in the oxygen storage capacity of the catalyst caused by whether or not the EGR is implemented, where the catalyst deterioration is diagnosed to be present by a higher oxygen storage capacity when the EGR is not implemented than when it is implemented. Therefore, with the device according to the first aspect of the invention, catalyst deterioration can be advantageously diagnosed, regardless of whether the EGR is introduced.

The second aspect of the invention resides in a device for diagnosing deterioration of a catalyst by a decrease in oxygen storage capacity. In the device, whether or not catalyst deterioration is present is determined by a number of times the oxygen storage capacity becomes below a reference value or a time interval in which the oxygen storage capacity is below the reference value; and when EGR is not implemented, catalyst deterioration is determined to be present by the number of times or time interval that is smaller than that when the EGR is implemented.

With the above-described configuration, when the EGR is not implemented, even if the number of times the oxygen storage capacity becomes below a reference value or the time interval in which the oxygen storage capacity is below the reference value is less than that when the EGR is implemented, the catalyst deterioration is diagnosed to have occurred. Accordingly, whether or not the deterioration is present can be adequately diagnosed, regardless of variations in the oxygen storage capacity of the catalyst caused by whether or not the EGR is implemented. Therefore, with the device according to the second aspect of the invention, catalyst deterioration can be advantageously diagnosed, regardless of whether the EGR is introduced.

The third aspect of the invention resides in a device for diagnosing deterioration of a catalyst by a decrease in oxygen storage capacity. In the device, a value of the oxygen storage capacity that is used to determine whether or not deterioration is present is corrected according to whether or not EGR is implemented.

As described hereinabove, even if the deterioration advance degree is the same, the oxygen storage capacity of the catalyst is higher when the EGR is not implemented than when it is implemented. Accordingly, whether or not the deterioration is present can be adequately diagnosed, regardless of variations in the oxygen storage capacity of the catalyst caused by whether or not the EGR is implemented, where the value of the oxygen storage capacity that is used to determine whether or not deterioration is present is corrected so that this value is higher when the EGR is implemented or corrected so that this value is lower when the EGR is not implemented. Therefore, with the device according to the third aspect of the invention, catalyst deterioration can be advantageously diagnosed, regardless of whether the EGR is introduced.

The fourth aspect of the invention resides in a method of diagnosing deterioration of a catalyst by a decrease in oxygen storage capacity. In this method, the oxygen storage capacity by which the catalyst deterioration is diagnosed to be present when EGR is not implemented is higher than the oxygen storage capacity by which the catalyst deterioration is diagnosed to be present when the EGR is implemented.

The fifth aspect of the invention resides in a method of diagnosing deterioration of a catalyst by a decrease in oxygen storage capacity. This method includes determining whether or not catalyst deterioration is present by a number of times the oxygen storage capacity becomes below a reference value or a time interval in which the oxygen storage capacity is below the reference value, and when EGR is not implemented, determining that catalyst deterioration has occurred by the number of times or time interval that is smaller than that when the EGR is implemented.

The sixth aspect of the invention resides in a method of diagnosing deterioration of a catalyst by a decrease in oxygen storage capacity. The method includes correcting a value of the oxygen storage capacity that is used to determine whether or not deterioration relating to the diagnostic is present according to whether or not EGR is implemented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS (First Embodiment)

The first embodiment of the catalyst deterioration diagnostic device in accordance with the invention will be explained below in greater detail with reference to FIGS. 1 to 5.

Figure 1:
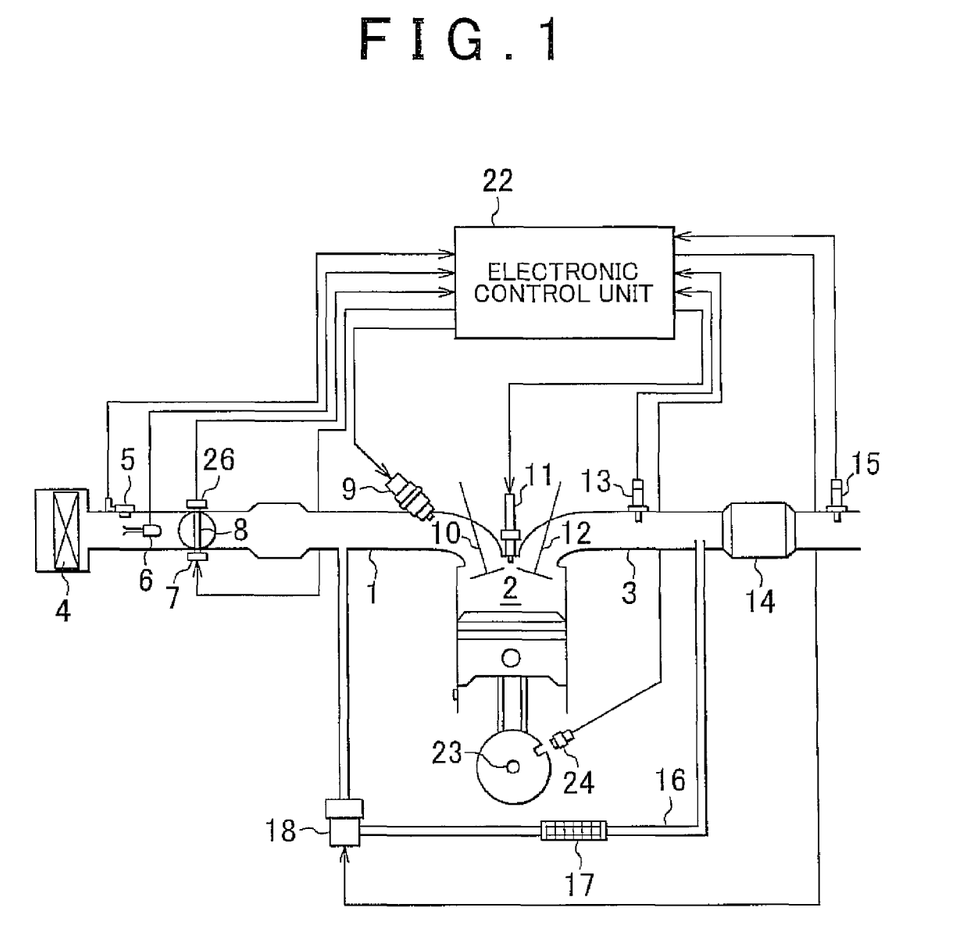
FIG. 1 is a schematic drawing illustrating the configuration of the internal combustion engine using the catalyst deterioration diagnostic device according to the first embodiment of the invention.

As shown in FIG. 1, an air cleaner 4 that purifies the intake air, an intake temperature sensor 5 that detects the air temperature, and an air flow meter 6 that detects the air flow rate are provided in the order of description from the upstream side in the intake passage 1 of an internal combustion engine. A throttle valve 8 that is driven by a throttle motor 7 and adjusts the flow rate of the air and an injector 9 that injects fuel into the air are provided downstream of the air flow meter 6 in the intake passage 1. The intake passage 1 is connected by an intake valve 10 to a combustion chamber 2. The intake valve 10 communicates the intake passage 1 with the combustion chamber 2 when the valve is open and interrupts the communication when the valve is closed.

A sparkplug 11, that ignites the mixture of fuel and air introduced into the combustion chamber 2, is disposed in the combustion chamber 2. The combustion chamber 2 is connected by an exhaust valve 12 to an exhaust passage 3. The exhaust valve 12 communicates the combustion chamber 2 with the exhaust passage 3 when the valve is open and interrupts the communication when the valve is closed.

A catalytic converter 14 supporting the catalyst for exhaust gas purification is disposed in the exhaust passage 3. An air/fuel ratio sensor 13 is provided upstream and an oxygen sensor 15 is provided downstream of the catalytic converter 14 in the exhaust passage 3.

Such an internal combustion engine is provided with an EGR system that recirculates part of exhaust gas in the air. The EGR system is provided with an EGR passage 16 that communicates the upstream side of the catalytic converter 14 in the exhaust passage 3 with the downstream side of the throttle valve 8 in the intake passage 1. Provided in the EGR passage 16 are an EGR cooler 17 that cools the exhaust gas recirculating through the passage and an EGR valve 18 that adjusts the EGR amount.

Such an internal combustion engine is controlled by an electronic control unit (ECU) 22. The ECU 22 is provided with a central processing unit (CPU) that executes a variety of computation processing operations relating to engine control and a read-only memory (ROM) storing programs and data for engine control. The ECU 22 is provided with a random access memory (RAM) that stores temporarily the computation results obtained in the CPU or detection results of sensors and an input/output (I/O) port that functions as an interface for exchanging signals with the outside.

Detection signals of the above-mentioned air temperature sensor 5, air flow meter 6, air/fuel ratio sensor 13, and oxygen sensor 15 are inputted to the input port of the ECU 22. Further, detection signals of a crank position sensor 24 that detects a rotation position of the crank shaft 23, which is the engine output shaft, and a throttle sensor 26 that detects the opening degree of the throttle valve 8 are also inputted to the input port of the ECU 22.

Meanwhile, drive circuits of various actuators provided in various units of the internal combustion engine, such as the throttle motor 7, injector 9, and sparkplug 11, are connected to the output port of the ECU 22. The ECU 22 performs engine control by outputting command signals to the drive circuits of the actuators.

Figure 2:
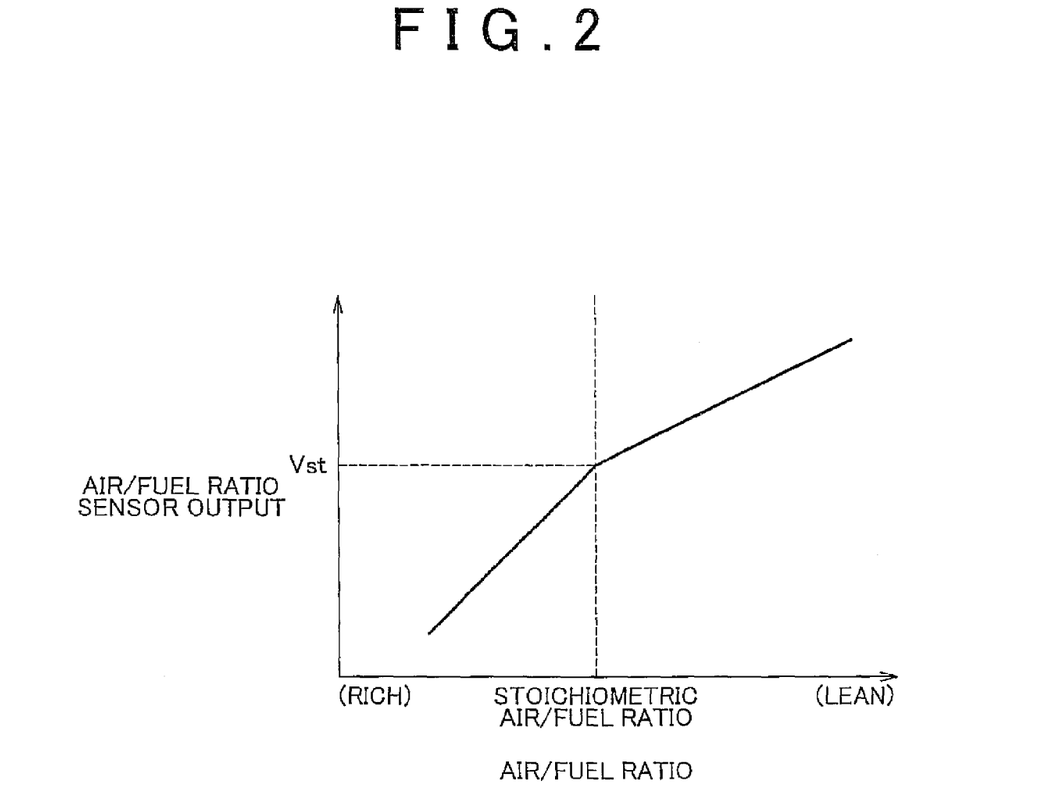
FIG. 2 is a graph illustrating the output characteristic of the air/fuel ratio sensor used in the first embodiment.

FIG. 2 shows an output characteristic of the air/fuel ratio sensor 13 that is used in the embodiment. As shown in the figure, the output of the air/fuel ratio sensor 13 increases with the increase in air/fuel ratio, that is, as the fuel/air ratio becomes leaner. The output Vst shown in the figure is the output of the air/fuel ratio sensor 13 corresponding to the stoichiometric air/fuel ratio.

Figure 3:
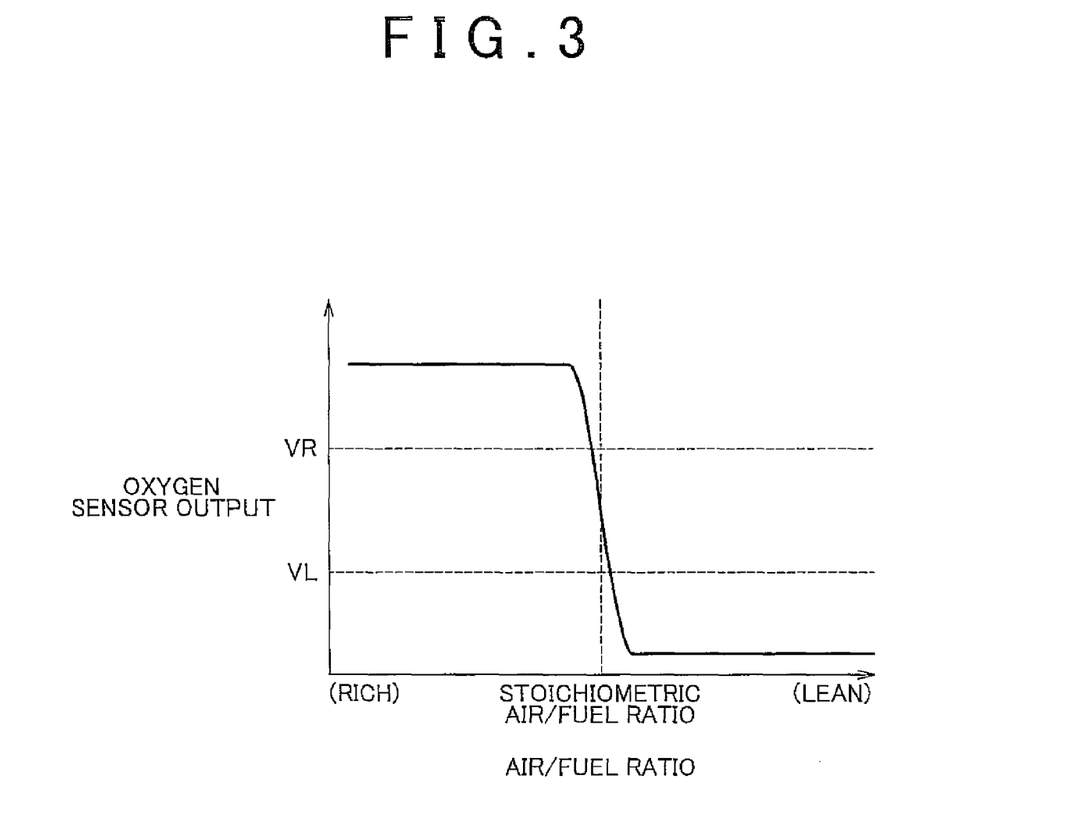
FIG. 3 is a graph illustrating the output characteristic of the oxygen sensor used in the first embodiment.

FIG. 3 shows an output characteristic of the oxygen sensor 15 that is used in the embodiment. As shown in the figure, the output of the oxygen sensor 15 changes significantly at the stoichiometric air/fuel ratio as a boundary. In this case, switching from a lean air/fuel ratio to a rich air/fuel ratio is confirmed by the increase in the output of the oxygen sensor 15 over a rich determination value VR, and switching from a rich air/fuel ratio to a lean air/fuel ratio is confirmed on the basis of the decrease in the output of the oxygen sensor 15 over a lean determination value VL.

The ECU 22 also diagnoses, as necessary, deterioration of the catalyst during engine operation. In the diagnostic process, the catalyst deterioration is diagnosed on the basis of the decrease in oxygen storage capacity of the catalyst, that is, the decrease in the maximum limit amount of oxygen that can be stored. The ECU 22 determines the oxygen storage capacity of the catalyst by the Cmax method.

Figure 4:
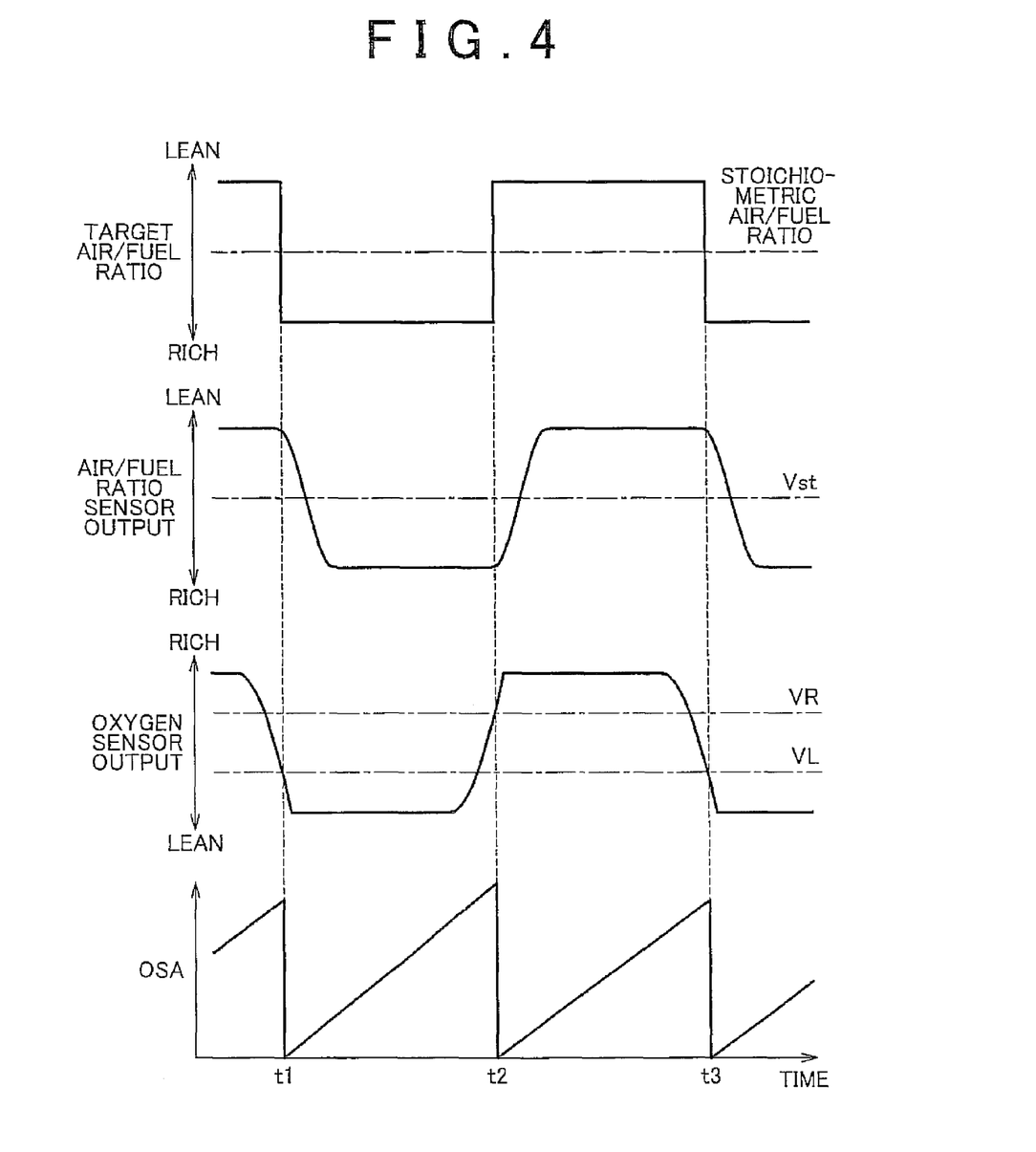
FIG. 4 is a time chart illustrating the transition of the target air/fuel ratio, air/fuel ratio sensor output, and oxygen sensor output during active air/fuel ratio control used in the first embodiment.

In the Cmax method, as shown in FIG. 4, the so-called active air/fuel ratio control is performed in which the target air/fuel ratio is forcibly shifted to the lean side and rich side. In such active air/fuel ratio control, the target air/fuel ratio is shifted to the rich side with respect to the stoichiometric air/fuel ratio as long as the oxygen sensor 15 generates a lean output and shifted to the lean side with respect to the stoichiometric air/fuel ratio as long as the oxygen sensor 15 generates a rich output. Thus, in the active air/fuel ratio control, the target air/fuel ratio is reversed between the rich air/fuel ratio and lean air/fuel ratio each time the output of the oxygen sensor 15 is reversed.

Under such air/fuel ratio active control, the state in which the catalyst stores the entire amount of oxygen that can be stored and the state in which the catalyst has released the entire absorbed oxygen are repeated. Accordingly, the Cmax, which is an indicator of oxygen storage capacity of the catalyst can be determined by determining the integral value OSAFALL of oxygen release amount during rich control and the integral value OSARISE of oxygen storage amount during lean control.

Here, the OSAFALL and OSARISE can be determined by integrating the OSA (oxygen storage/release amount) per unit time that is calculated by the following Eq. (1). In Eq. (1) below, "$\alpha$" is a constant (=0.23) indicating the oxygen mass ratio in the air, and $\Delta A/F$ is worked out by subtracting the stoichiometric air/fuel ratio output Vst from the air/fuel ratio sensor output.

$$\text{OSA per unit time} = \alpha \times \Delta A/F \times (\text{fuel injection amount}) \quad (1)$$

Cmax is determined as an average value of OSAFALL and OSARISE. The catalyst deterioration is diagnosed by using Cmax that has been corrected with respect to the catalyst temperature or atmospheric pressure.

As mentioned hereinabove, the oxygen storage capacity of the catalyst differs significantly between the periods in which the EGR is implemented and not implemented. More specifically, as shown in FIG. 10, in the period in which the EGR is implemented (EGR is present), the oxygen storage capacity of the catalyst is higher than that in the period in which the EGR is not implemented (EGR is absent). Therefore, even when it is determined that there is a sufficient oxygen storage capacity and that the catalyst has not deteriorated on the basis of the Cmax value measured in the period in which the EGR is implemented, it can happen that the oxygen storage capacity of the catalyst is insufficient in the period in which the EGR is not implemented.

Accordingly, in the embodiment, different catalyst deterioration determination values are used for the periods in which the EGR is implemented and not implemented. More specifically, the Cmax value by which the catalyst deterioration is diagnosed to be present when the EGR is not implemented is set higher than the Cmax value by which the catalyst deterioration is diagnosed to be present when the EGR is implemented.

Figure 5:
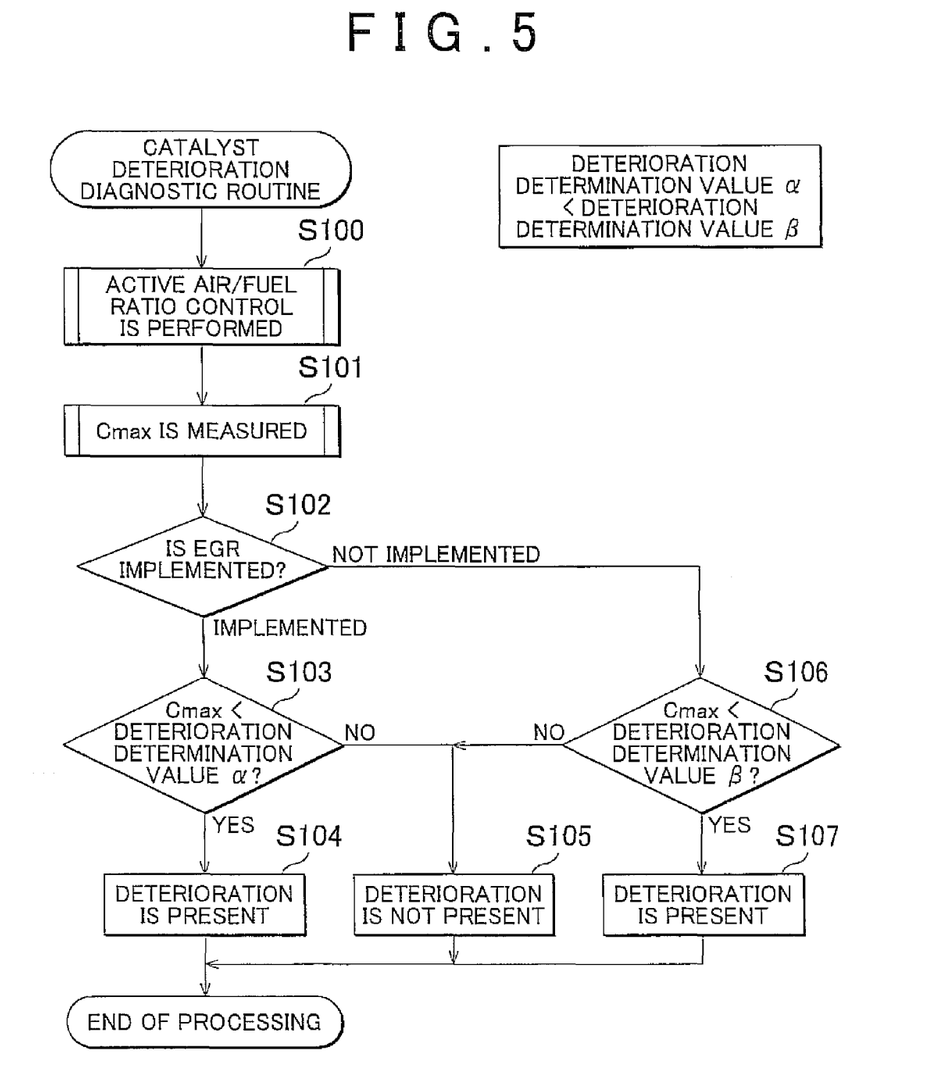
FIG. 5 is a flowchart illustrating the processing sequence of the catalyst deterioration diagnostic routine used in the first embodiment.

FIG. 5 is a flowchart illustrating the processing sequence of the catalyst deterioration diagnostic routine used in the embodiment. The processing of the routine is implemented by the ECU 22 when the implementation conditions of catalyst deterioration diagnostic are satisfied.

When the routine is started, first, active air/fuel ratio control is performed in step S100. Then, Cmax is measured in the next step S101. It is thereafter determined in step S102 whether or not the EGR is implemented. If the EGR is implemented, it is determined in step S103 whether or not the catalyst has deteriorated by determining whether or not the Cmax is less than a deterioration determination value a.

Where the Cmax is less than the deterioration determination value α (S103: YES), the deterioration is diagnosed in step S104 to be present, and when the Cmax is equal to or greater than the deterioration determination value a (S103: NO), the deterioration is diagnosed in step S105 to be absent.

By contrast, where the EGR is not implemented, it is determined in step S106 whether or not the catalyst has deteriorated by determining whether or not the Cmax is less than a deterioration determination value β. As the deterioration determination value β to be used, a value larger than the deterioration determination value α, which is used when implementing EGR, is set. Where the Cmax is less than the deterioration determination value β (S106: YES), the deterioration is diagnosed in step S107 to be present, and when the Cmax is equal to or greater than the deterioration determination value β (S106: NO), the deterioration is diagnosed in step S105 to be absent.

With the catalyst deterioration diagnostic device of the above-described embodiment, the following effects are demonstrated. (1) In the embodiment, the oxygen storage capacity (Cmax) by which the catalyst deterioration is diagnosed to be present when the EGR is not implemented is higher than the oxygen storage capacity (Cmax) by which the catalyst deterioration is diagnosed to be present when EGR is implemented. As described hereinabove, even when the deterioration advance degree is the same, the oxygen storage capacity of the catalyst is higher when the EGR is not implemented than when it is implemented. Accordingly, where the catalyst deterioration is diagnosed to be present by the oxygen storage capacity that is higher when the EGR is not implemented than when it is implemented, the presence of deterioration can be adequately diagnosed, regardless of the difference in oxygen storage capacity of the catalyst between the periods in which the EGR is implemented and not implemented. Therefore, catalyst deterioration can be advantageously diagnosed, regardless of whether the EGR is introduced.

(Second Embodiment)

The second embodiment of the catalyst deterioration diagnostic device in accordance with the invention will be explained below in detail with reference to FIG. 6. In the embodiment and in the subsequent embodiments, components similar to those of the above-described embodiment will be assigned with same reference numerals and detailed explanation thereof will be omitted.

In the first embodiment, catalyst deterioration is diagnosed to be present when Cmax is less than the deterioration determination values α and β. By using such different catalyst determination values, it is possible to perform effective deterioration diagnostic when the EGR is implemented and when it is not implemented.

By contrast, in the embodiment, the number of times the Cmax has been confirmed to be less than a reference value γ is counted and catalyst deterioration is diagnosed to be present when this number exceeds a deterioration determination value. By diagnosing that catalyst deterioration is present by the number that is less when the EGR is not implemented than when it is implemented, it is possible to perform effective deterioration diagnostic when the EGR is implemented and when it is not implemented.

Figure 6:
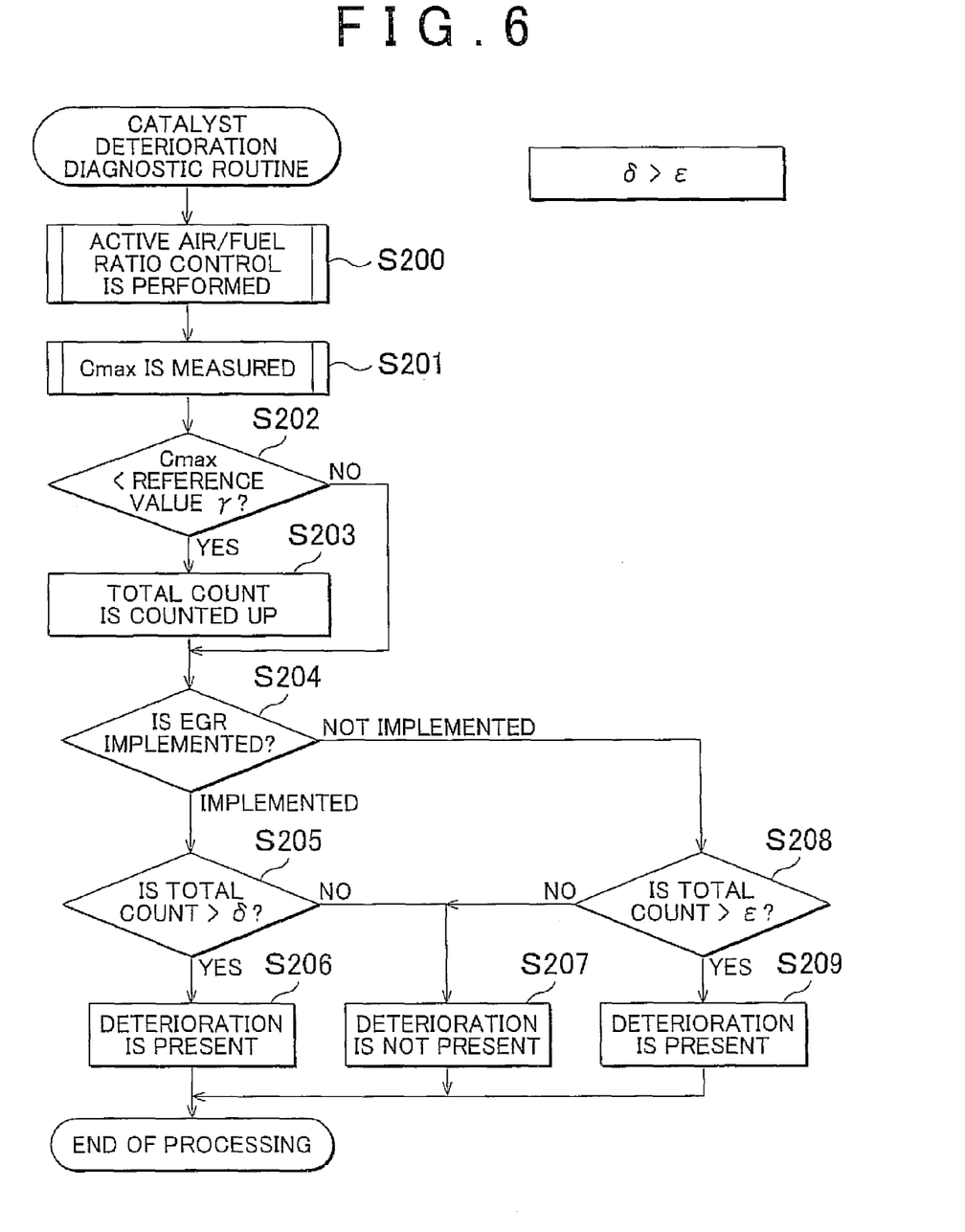
FIG. 6 is a flowchart illustrating the processing sequence of the catalyst deterioration diagnostic routine used in the second embodiment of the invention.

FIG. 6 is a flowchart illustrating the processing sequence of the catalyst deterioration diagnostic routine used in the embodiment. The processing of the routine is implemented by the ECU 22 when the implementation conditions of catalyst deterioration diagnostic are satisfied.

When the routine is started, first, active air/fuel ratio control is performed in step S200. Then, Cmax is measured in the next step S201. It is thereafter determined in step S202 whether or not the measured Cmax is less than the reference value γ. Where the Cmax is less than the reference value γ (S202: YES), in step S203 the value of the total count indicating the number of times the Cmax has been less than the reference value γ is counted up.

Then, in step S204, it is determined whether or not the EGR is implemented. Where the EGR is implemented, it is determined in step S205 whether or not the value of the total count exceeds a deterioration determination value δ. Where the value of the total count exceeds a deterioration determination value δ (S205: YES), deterioration is determined in step S206 to be present, and where the value of the total count is equal to or less than the deterioration determination value δ (S205: NO), deterioration is determined in step S207 to be absent.

Meanwhile, where the EGR is not implemented, it is determined in step S208 whether or not the value of the total count exceeds a deterioration determination value ε. A value that is less than the deterioration determination value δ used when the EGR is implemented is set as the deterioration determination value ε used herein. Where the value of the total count exceeds the deterioration determination value ε (S208: YES), deterioration is determined in step S209 to be present, and where the value of the total count is equal to or less than the deterioration determination value ε (S208: NO), deterioration is determined in step 5207 to be absent.

With the catalyst deterioration diagnostic device of the above-described embodiment, the following effects are demonstrated. (1) In the embodiment, the presence or absence of catalyst deterioration is determined by the number of times the Cmax has been below the reference value γ, and the number by which the catalyst deterioration is diagnosed to be present when the EGR is not implemented is higher than that when EGR is implemented. Accordingly, the presence of deterioration can be adequately diagnosed, regardless of the difference in oxygen storage capacity of the catalyst between the periods in which the EGR is implemented and not implemented. Therefore, according to the embodiment, catalyst deterioration can be advantageously diagnosed, regardless of whether the EGR is introduced.

(Third Embodiment)

The third embodiment of the catalyst deterioration diagnostic device in accordance with the invention will be explained below in detail with reference to FIG. 7.

In the first and second embodiments, by changing the deterioration determination value according to whether or not the EGR is implemented, it is possible to perform effective catalyst deterioration diagnostic when the EGR is implemented and when it is not implemented. In the embodiment, the value of Cmax that is used to determine whether catalyst deterioration is present is corrected on the basis of whether the EGR is implemented. In the embodiment, when the EGR is implemented, the deterioration diagnostic is performed by using the measured Cmax value as is, and when the EGR is not implemented, the deterioration diagnostic is performed by using the measured Cmax value that has been EGR corrected. In this case, the EGR correction is performed to reduce further the Cmax value for deterioration determination when the EGR is not implemented.

Figure 7:
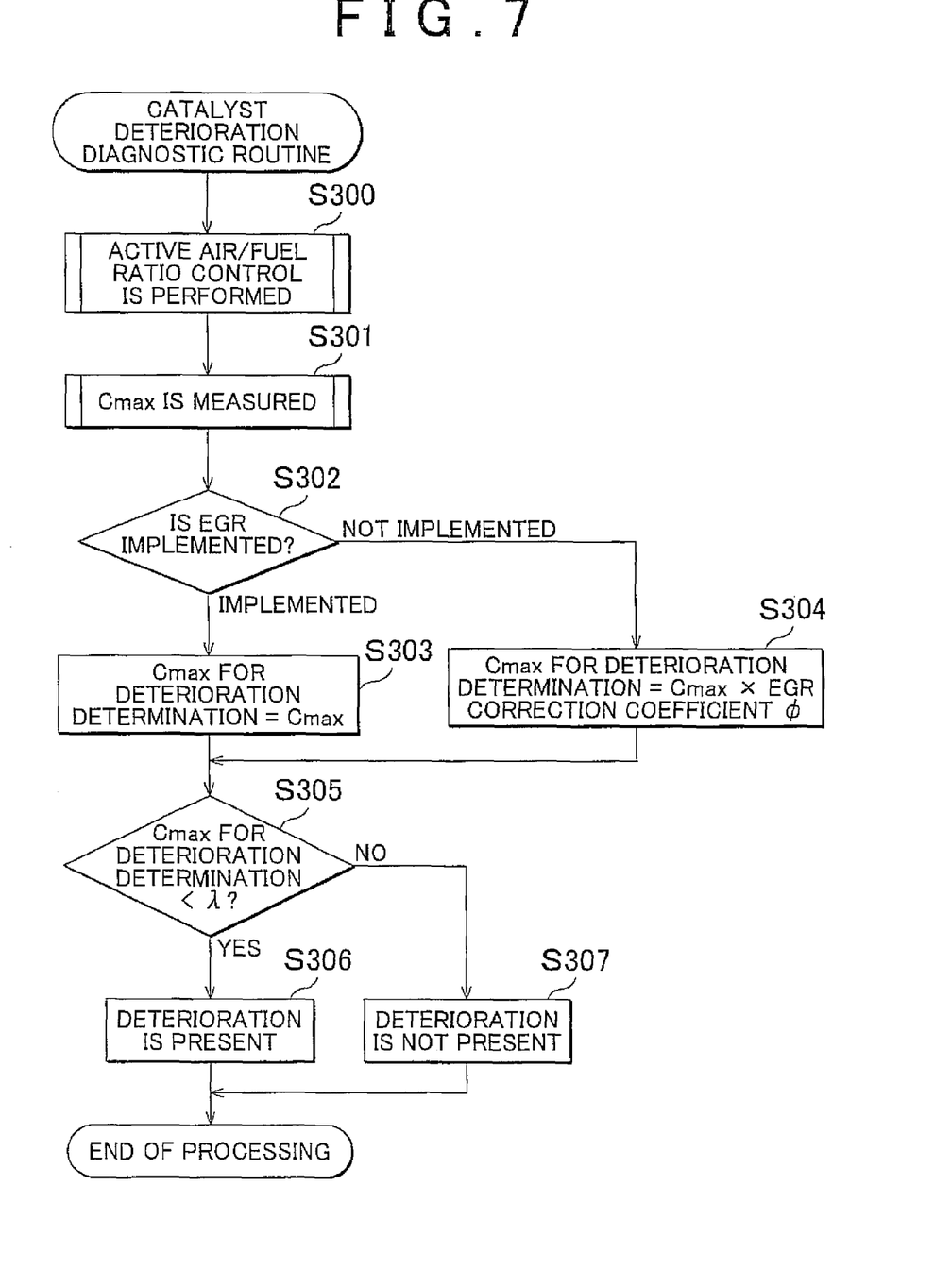
FIG. 7 is a flowchart illustrating the processing sequence of the catalyst deterioration diagnostic routine used in the third embodiment of the invention.

FIG. 7 is a flowchart illustrating the processing sequence of the catalyst deterioration diagnostic routine used in the embodiment. The processing of the routine is implemented by the ECU 22 when the implementation conditions of catalyst deterioration diagnostic are satisfied.

When the routine is started, first, active air/fuel ratio control is performed in step S300. Then, Cmax is measured in the next step S301. It is thereafter determined in step S302 whether or not the EGR is implemented. If the EGR is implemented, it is determined in step S303 whether the measured Cmax value is used as is as the Cmax for deterioration determination. Meanwhile, when the EGR is not implemented, in step S304 a value obtained by multiplying the measured Cmax value by an EGR correction coefficient $\phi$ is used as the Cmax for deterioration determination. The EGR correction coefficient $\phi$ serves to correct the difference in Cmax between the periods in which the EGR is implemented and not implemented and is set to a value less than "1.0". The value of the EGR correction coefficient $\phi$ is set to vary according, for example, to the intake air amount of the internal combustion engine.

Where such Cmax for deterioration determination is set, it is determined in the next step S305 whether or not the value of the Cmax for deterioration determination is less than the deterioration determination value $\lambda$. Where the value of the Cmax for deterioration determination is less than the deterioration determination value $\lambda$, (S305: YES), deterioration is diagnosed in step S306 to be present. Otherwise (S305: NO), deterioration is determined in step S307 to be absent.

With the catalyst deterioration diagnostic device of the above-described embodiment, the following effects are demonstrated. (1) In the embodiment, the value of Cmax used to determine whether or not the deterioration is present, is corrected according to whether or not the EGR is implemented. As described hereinabove, even when the deterioration advance degree is the same, the oxygen storage capacity of the catalyst, that is, a Cmax value, is higher when the EGR is not implemented than when it is implemented. Accordingly, where the value of Cmax for deterioration determination is corrected so as to be lower when the EGR is not implemented, the presence of deterioration can be adequately diagnosed, regardless of the difference in oxygen storage capacity of the catalyst between the periods in which the EGR is implemented and not implemented. Therefore, in the embodiment, catalyst deterioration can be advantageously diagnosed, regardless of whether the EGR is introduced.

(Fourth Embodiment)

The fourth embodiment of the catalyst deterioration diagnostic device in accordance with the invention will be explained below in detail with reference to FIG. 8.

Where the time interval of exposure to a high temperature is extended, the exhaust gas purification capability, in particular NOx purification capability, of a catalyst, can decrease even if the oxygen storage capacity remains high. Accordingly, in the embodiment, the value of Cmax used for determining whether or not deterioration is present is corrected so as to decrease as the time interval of catalyst exposure to a high temperature is extended. Further, in such a case, the deterioration diagnostic associated with the catalyst temperature history is performed simultaneously with the deterioration diagnostic based on the decrease in oxygen storage capacity.

Figure 8:
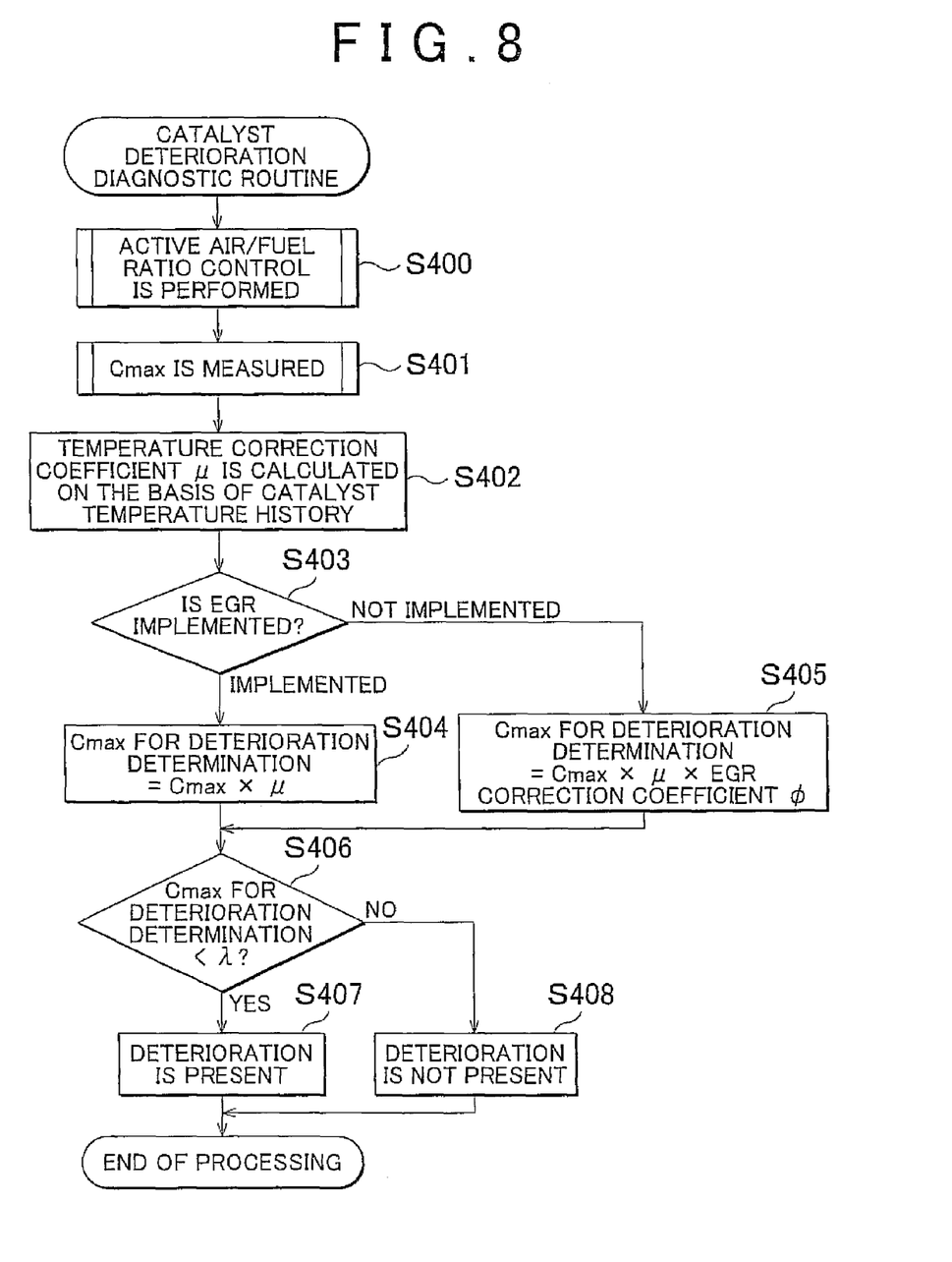
FIG. 8 is a flowchart illustrating the processing sequence of the catalyst deterioration diagnostic routine used in the fourth embodiment of the invention.

FIG. 8 is a flowchart illustrating the processing sequence of the catalyst deterioration diagnostic routine used in the embodiment. The processing of the routine is implemented by the ECU 22 when the implementation conditions of catalyst deterioration diagnostic are satisfied.

When the routine is started, first, active air/fuel ratio control is performed in step S400. Then, Cmax is measured in the next step S401. Then, in step S402, a temperature correction coefficient $\mu$ based on the catalyst temperature history is calculated. A positive value equal to or less than "1.0" is set herein as the temperature correction coefficient $\mu$, and a smaller value is set with respect to a longer period of catalyst exposure to a high temperature.

It is thereafter determined in step S403 whether or not the EGR is implemented. If the EGR is implemented, in step S404 a value obtained by multiplying the measured Cmax by the temperature correction coefficient $\mu$ is used as the Cmax for deterioration determination. Meanwhile, when the EGR is not implemented, in step S405 a value obtained by multiplying the measured Cmax value by the temperature correction coefficient $\mu$ and the above-mentioned EGR correction coefficient $\phi$ is used as the Cmax for deterioration determination.

Where the Cmax for deterioration determination is thus set, it is then determined in step S406 whether or not the value of Cmax for deterioration determination is less than the deterioration determination value $\lambda$. Where the value of Cmax for deterioration determination is less than the deterioration determination value $\lambda$ (S406:YES), deterioration is diagnosed in step S407 to be present. Otherwise (S406:NO), deterioration is determined in step S408 to be absent.

With the catalyst deterioration diagnostic device of the above-described embodiment, the following effects are demonstrated. (1) In the embodiment, the value of Cmax used to determine whether or not the deterioration is present is corrected according to whether or not the EGR is implemented. Therefore, in the embodiment, catalyst deterioration can be advantageously diagnosed, regardless of whether the EGR is introduced.

(2) In the embodiment, the value of Cmax used to determine whether or not the deterioration is present is corrected according to the catalyst temperature history. Therefore, the diagnostic of deterioration caused by the decrease in purification capability of NOx or the like associated with the catalyst temperature history can be performed simultaneously with the diagnostic of deterioration caused by the decrease in oxygen storage capability.

(Fifth Embodiment)

The fifth embodiment of the catalyst deterioration diagnostic device in accordance with the invention will be explained below in detail with reference to FIG. 9.

As shown in FIG. 11 mentioned hereinabove, the catalyst temperature varies depending on whether or not the EGR is implemented. More specifically, the catalyst temperature tends to be higher when the EGR is not implemented than when it is implemented. Therefore, the period in which the catalyst is exposed to a high temperature easily increases and purification capability of NOx or the like easily decreases when the period in which the EGR is not implemented is extended. Accordingly, in the embodiment, the value of Cmax for deterioration determination is corrected according to the ratio of periods in which the EGR is implemented and not implemented. Further, in such a case, the diagnostic of deterioration caused by the decrease in purification capability of NOx or the like associated with the catalyst temperature history is performed simultaneously with the deterioration diagnostic based on the decrease in oxygen storage capacity.

Figure 9:
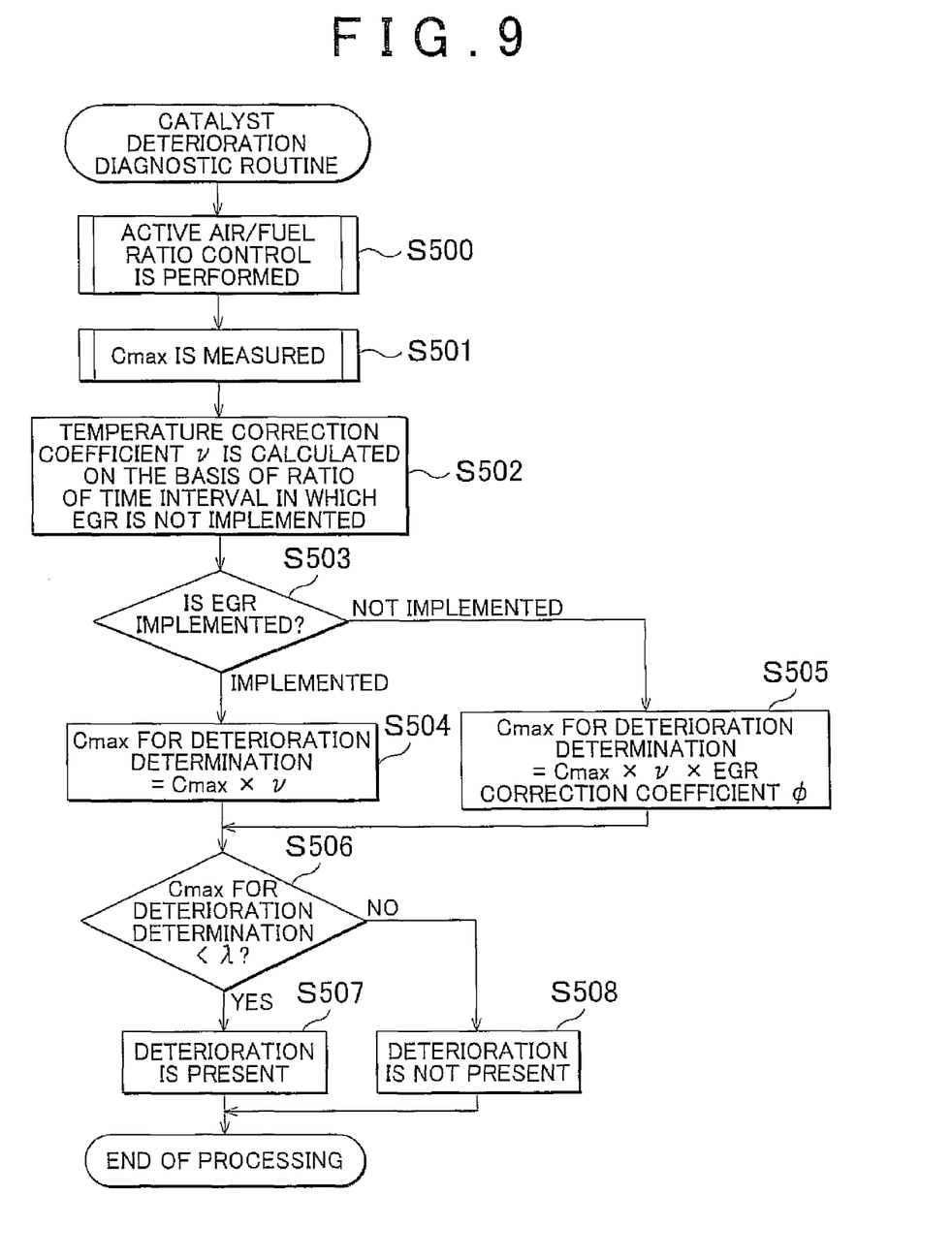
FIG. 9 is a flowchart illustrating the processing sequence of the catalyst deterioration diagnostic routine used in the fifth embodiment of the invention.

FIG. 9 is a flowchart illustrating the processing sequence of the catalyst deterioration diagnostic routine used in the embodiment. The processing of the routine is implemented by the ECU 22 when the implementation conditions of catalyst deterioration diagnostic are satisfied.

When the routine is started, first, active air/fuel ratio control is performed in step S500. Then, Cmax is measured in the next step S501. Then, in step S502, a temperature correction coefficient $\nu$ based on the ratio of the period in which the EGR is not implemented in the operation time of the internal combustion engine is calculated. The temperature correction coefficient $\nu$ is calculated by the following Eq. (2).

Temperature correction coefficient ν=β×[(Period in which EGR is not implemented)/(Operation time of internal combustion engine)]   (2)

Here, the constant β is set on the basis of catalyst temperature distributions obtained when the EGR is implemented and not implemented that are shown in FIG. 11. As shown in the figure, in the catalyst temperature distribution obtained when the EGR is implemented, the maximum frequency is assumed at 800° C. and this frequency is 13%. By contrast, in the catalyst temperature distribution obtained when the EGR is not implemented, the maximum frequency is assumed at 875° C. and this frequency is 19%. The constant β is calculated by Eq. (3) below.

β=(875° C.×19%)/(800° C.×13%)≅1.6   (3)

Where the temperature correction coefficient ν is thus calculated, it is then determined in step S503 whether or not the EGR is implemented. If the EGR is implemented, a value obtained by multiplying the measured Cmax by the temperature correction coefficient ν is used in step S504 as the Cmax for deterioration determination. Meanwhile, where the EGR is not implemented, in step S505 a value obtained by multiplying the measured Cmax value by the temperature correction coefficient ν and the above-mentioned EGR correction coefficient φ is used as the Cmax for deterioration determination.

Where the Cmax for deterioration determination is thus set, it is then determined in step S506 whether or not the value of Cmax for deterioration determination is less than the deterioration determination value λ. Where the value of Cmax for deterioration determination is less than the deterioration determination value λ (S506:YES), deterioration is diagnosed in step S507 to be present. Otherwise (S506:NO), deterioration is determined in step S508 to be absent.

With the catalyst deterioration diagnostic device of the above-described embodiment, the following effects are demonstrated. (1) In the embodiment, the value of Cmax used to determine whether or not the deterioration is present is corrected according to whether or not the EGR is implemented. Therefore, in the embodiment, catalyst deterioration can be advantageously diagnosed, regardless of whether the EGR is introduced.

(2) In the embodiment, the value of oxygen storage capacity used to determine whether or not the deterioration is present is corrected according to the ratio of the time interval in which the EGR is not implemented in the operation time of the internal combustion engine. Where the time interval in which the EGR is not implemented is extended, the time of catalyst exposure to a high temperature is extended and catalyst deterioration can easily occur. However, in the embodiment, it is possible to perform catalyst deterioration determination in which the difference in deterioration advance degree caused by the presence of EGR is taken into account.

The above-described embodiments can be also implemented with the below-described modifications. In the fifth embodiment, the temperature correction coefficient ν is calculated from the ratio of time interval in which the EGR is not implemented in the operation time of the internal combustion engine, but the temperature correction coefficient ν can be also calculated from the ratio of time interval in which the EGR is implemented in the operation time of the internal combustion engine. In this case, the temperature correction coefficient ν is multiplied by the measured Cmax value when the Cmax for deterioration determination during EGR implementation is calculated.

In the third to fifth embodiments, the EGR correction coefficient φ is calculated according to the intake air amount in the internal combustion engine, but the feature of taking the EGR introduction amount into consideration when calculating the EGR correction coefficient φ can be also considered. In such a case, the EGR correction coefficient φ is set to a lower value when the EGR introduction amount is large.

In the third to fifth embodiments, the deterioration diagnostic is performed using the measured Cmax value as is when the EGR is implemented and by using the measured Cmax value that has been subjected to EGR correction when the EGR is not implemented. Thus, in the third embodiment, the catalyst deterioration diagnostic is performed using a value obtained by conducting the EGR correction with respect to the measured Cmax value obtained when the EGR is not implemented. The catalyst deterioration diagnostic can be also performed using a value obtained by conducting the EGR correction with respect to the measured Cmax value obtained when the EGR is implemented. In this case, the EGR correction is performed such that the value of Cmax for deterioration determination is higher when the EGR is implemented.

In the second embodiment, the catalyst deterioration diagnostic is performed on the basis of the number of times the Cmax has been confirmed to be less than the reference value γ, but the catalyst deterioration diagnostic can be also performed on the basis of time interval in which the Cmax is less than the reference value γ. In such a case, where the catalyst deterioration is diagnosed to be present by a shorter time interval when the EGR is not implemented than when it is implemented, catalyst deterioration can be advantageously diagnosed, regardless of whether the EGR is introduced.

In the second embodiment and variation examples thereof, the number of times or time interval by which the deterioration is diagnosed to be present may be changed according to the EGR introduction amount. The number of times or time interval by which the deterioration is diagnosed in this case is set to a smaller value when the EGR introduction amount is large.

In the first embodiment, the deterioration determination values are switched between a period in which EGR is introduced and a period in which it is not introduced, but it is also possible to change the deterioration determination value according to the EGR introduction amount. In this case where the EGR introduction amount is large, a larger value is set as the deterioration determination value.

In the first and second embodiments, the value of Cmax used for catalyst deterioration determination may be corrected according to the catalyst temperature history or ratio of the period in which the EGR is not implemented in the operation time of the internal combustion engine. In such a case, it is possible to perform catalyst deterioration diagnostic in which the difference in the deterioration advance degree caused by the catalyst temperature history or presence of EGR is taken into account.

In the above-described embodiments, the oxygen storage capacity of the catalyst is measured on the basis of the Cmax method, but the oxygen storage capacity of the catalyst can be also measured by other methods.

Further, where the time interval of exposure to a high temperature is extended, the exhaust gas purification capability, in particular NOx purification capability, of the catalyst, can decrease even if the oxygen storage capacity remains high. Accordingly, where the value of the oxygen storage capacity of the catalyst used for determining whether or not deterioration is present is corrected so as to decrease as the time interval of catalyst exposure to a high temperature is extended, the deterioration diagnostic associated with the catalyst temperature history can be performed simultaneously with the deterioration diagnostic based on the decrease in oxygen storage capacity. Therefore, where the value of the oxygen storage capacity used for determining whether or not deterioration is present is corrected according to the catalyst temperature history, the catalyst deterioration diagnostic can be performed even more advantageously. In this connection, when the EGR is not implemented, although the oxygen storage capacity of the catalyst is higher than that when the EGR is implemented, the temperature of exhaust gas flowing to the catalyst is higher than that when the EGR is implemented. Therefore, in long-term observations, the catalyst deterioration tends to advance with the extension of the period in which the EGR is not introduced.

Further, the exhaust gas temperature differs and the catalyst temperature also differs depending on whether or not the EGR is implemented. More specifically, when the EGR is not implemented, the exhaust gas temperature is higher and the catalyst temperature is also higher than those when the EGR is implemented. For this reason, when the time interval in which the EGR is not implemented is extended, the time interval of exposure to a high temperature is extended and the catalyst easily deteriorates. Therefore, where the value of oxygen storage capacity used for determining whether or not the deterioration is present is corrected according to the ratio of the time interval in which the EGR is not implemented in the operation time interval of the internal combustion engine, it is possible to perform catalyst deterioration diagnostic in which the difference in the deterioration advance degree caused by the presence of EGR is taken into account.

Further, the oxygen storage capacity of the catalyst can be determined as an average value of two integral values, namely, an integral value of an oxygen release amount during rich-side control and an integral value of oxygen storage capacity during lean-side control when the air/fuel ratio of exhaust gas flowing to the catalyst is forcibly switched to the rich side and lean side on the basis of Cmax method.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A device for diagnosing deterioration of a catalyst on the basis of a decrease in oxygen storage capacity, said device comprising:
    a determination section that determines whether the catalyst has deteriorated by comparing a determination value to either a number of times the oxygen storage capacity becomes below a reference value or a time interval in which the oxygen storage capacity is below the reference value, the determination value used when exhaust gas recirculation is not implemented, is smaller than the determination value used when the exhaust gas recirculation is implemented.

2. The device for diagnosing deterioration of a catalyst according to claim 1, wherein the determination section corrects a value of the oxygen storage capacity, that is used to determine whether or not deterioration relating to the diagnostic is present, according to temperature history of the catalyst.

3. The device for diagnosing deterioration of a catalyst according to claim 1, wherein the determination section corrects a value of the oxygen storage capacity, that is used to determine whether or not deterioration relating to the diagnostic is present, according to a ratio of a period, in which exhaust gas recirculation is not implemented, to an operation time of an internal combustion engine.

4. The device for diagnosing deterioration of a catalyst according to claim 1, wherein the determination section determines the oxygen storage capacity as an average value of two integral values, which are, an integral value of an oxygen release amount during rich-side control and an integral value of oxygen storage capacity during lean-side control when an air/fuel ratio of exhaust gas flowing to the catalyst is forcibly switched to the rich side and lean side.

5. A method of diagnosing deterioration of a catalyst on the basis of a decrease in oxygen storage capacity, said method comprising:
    determining, by an electronic control unit, whether the catalyst has deteriorated by comparing a determination value to either a number of times the oxygen storage capacity becomes below a reference value or a time interval in which the oxygen storage capacity is below the reference value;
    the determination value used when exhaust gas recirculation is not implemented, is smaller than the determination value used when the exhaust gas recirculation is implemented.

6. A device for diagnosing deterioration of a catalyst, comprising:
    a determination section that determines that the catalyst has deteriorated when a number of times oxygen storage capacity becomes below a first reference value is greater than a third number while exhaust gas recirculation is implemented, and that determines that the catalyst has deteriorated when the number of times the oxygen storage capacity becomes below the first reference value is greater than a fourth number smaller than the third number while exhaust gas recirculation is not implemented, or that determines that the catalyst has deteriorated when a total period of time in which the oxygen storage capacity is below a second reference value is longer than a fifth time period while exhaust gas recirculation is implemented, and that determines that the catalyst has deteriorated when the total period of time in which the oxygen storage capacity is below the second reference value is longer than a sixth time period shorter than the fifth time period while exhaust gas recirculation is not implemented.

* * * * *